United States Patent [19]

Gallagher et al.

[11] 4,359,549

[45] Nov. 16, 1982

[54] POLYURETHANE SEALANT COMPOSITIONS

[75] Inventors: James A. Gallagher, Grosse Ile; Bernardas Brizgys, Southgate, both of Mich.

[73] Assignee: BASF Wyandotte Corporation, Wyandotte, Mich.

[21] Appl. No.: 304,730

[22] Filed: Sep. 23, 1981

Related U.S. Application Data

[62] Division of Ser. No. 139,929, Apr. 14, 1980, Pat. No. 4,318,838.

[51] Int. Cl.$^3$ .............................................. C08L 75/08
[52] U.S. Cl. ...................................... 524/791; 524/789
[58] Field of Search ................................ 524/789, 791

[56] References Cited

U.S. PATENT DOCUMENTS

| | | | |
|---|---|---|---|
| 3,450,653 | 6/1969 | McClellan | 524/789 |
| 3,484,517 | 12/1969 | Ligon et al. | 264/259 |
| 3,886,122 | 5/1975 | Fabris et al. | 156/331 |
| 4,240,950 | 12/1980 | von Bonin et al. | 521/127 |
| 4,250,077 | 2/1981 | von Bonin et al. | 525/28 |

*Primary Examiner*—Lewis T. Jacobs
*Attorney, Agent, or Firm*—David L. Hedden; Joseph D. Michaels

[57] ABSTRACT

The subject matter of this invention pertains to polyurethane sealant compositions which are flexible, strong, and resistant to shrinkage. The sealants are prepared by reacting a mixture of polyether polyol and inorganic filler with a polyisocyanate. The polyurethane sealants are useful for making castings, for patching, and as heat barriers.

4 Claims, No Drawings

4,359,549

POLYURETHANE SEALANT COMPOSITIONS

CROSS REFERENCE TO RELATED APPLICATION

This application is a divisional of applicants' copending application, Ser. No. 139,929 filed on Apr. 14, 1980, now U.S. Pat. No. 4,318,838, issued Mar. 9, 1982.

BACKGROUND OF THE INVENTION

1. Field of the Invention

This invention pertains to the preparation of noncellular polyurethane sealant compositions containing an inorganic filler.

2. Description of the Prior Art

Those skilled in the art know that polyurethane sealant compositions can be prepared by mixing a polyol with an inorganic filler and reacting the mixture with a polyisocyanate. U.S. Pat. Nos. 3,450,653 and 3,484,517 are two examples of patents which disclose this teaching. The sealants disclosed in the prior art, however, have limited utility because their physical properties, such as tensile strength, hardness, brittleness, heat distortion, impact strength, and shrinkage resistance, have values which, although desirable for some uses, make them undesirable for other uses.

Applicants have discovered a method for preparing sealants which are strong, flexible, and shrinkage resistant. The sealants are prepared by mixing a polyether polyol or polyether polyol blend, having a branching density of 400 grams to 700 grams per branching unit, with inorganic fillers in an amount from 0.15 part to 0.7 part by weight per part of polyether polyol or polyether polyol blend. The mixture is reacted with a polyisocyanate to form the polyurethane sealant. Applicant is not aware of any reference which discloses this combination of ingredients or the significance of the combination. The polyols disclosed in U.S. Pat. Nos. 3,450,653 and 3,484,517 do not have branching densities of 400 grams to 700 grams per branching unit, and the amount of filler used in these processes exceeds the amount taught by the applicants.

SUMMARY OF THE INVENTION

Polyurethane sealants disclosed in the prior art have limited utility because one or more of their properties, such as tensile strength, hardness, brittleness, heat distortion, impact strength, and shrinkage have values which, although desirable for some uses, make them undesirable for other uses. This problem was solved by developing a polyurethane sealant composition prepared by (a) mixing a polyether polyol or polyether polyol blend having a branching density of 400 grams to 700 grams per branching unit with an inorganic filler selected from the group consisting of calcium silicate, aluminum silicate, magnesium silicate, and mixtures thereof, said filler being added in an amount which is from 0.15 part to 0.7 part by weight per part by weight of polyol, and (b) reacting the mixture made in accordance with paragraph (a) with a polyisocyanate such that the ratio of isocyanate groups of the polyisocyanate to the hydroxyl groups of the polyether polyol is 1.0:1 to 1.2:1.

The polyurethane sealants thus prepared are strong, flexible, and resistant to shrinkage. They can be used for patching floors and roads, to make castings of wheels and rollers, as heat barriers in the manufacture of aluminum windows and door frames, and for other purposes.

DESCRIPTION OF THE PREFERRED EMBODIMENTS

The polyurethane sealants, which are the subject matter of this invention, are prepared by mixing a polyether polyol or polyether polyol blend and an inorganic filler, and reacting the mixture with a polyisocyanate. The reaction will occur at room temperature in the absence of catalyst. However, to increase the reaction rate, catalysts may be added or the initiation temperature of the reactants may be increased to an upper limit of 120° F.

The polyether polyol or polyether polyol blends which are employed in the subject invention are well known in the art and are generally referred to as polyoxyalkylene polyols. These polyols are prepared by the reaction of an alkylene oxide with a polyhydric alcohol. Alkylene oxides which may be employed in the preparation of the polyols of the present invention include ethylene oxide, propylene oxide, the isomeric normal butylene oxides, hexylene oxide, octylene oxide, dodecene oxide, methoxy and other alkoxy propylene oxides, styrene oxide and cyclohexene oxide. Halogenated alkylene oxides may also be used, such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any above alkylene oxides may also be employed.

The polyoxyalkylene polyols may have either primary or secondary hydroxyl groups and preferably are prepared from alkylene oxides having from 2 to 6 carbon atoms such as polyoxyethylene and polyoxypropylene polyols. The polyoxyalkylene polyols may be prepared by any known process such as, for example, the process disclosed by Wurtz in 1859 and *Encyclopedia of Chemical Technology*, Vol. 7, pages 257–262, published by Interscience Publishers, Inc. (1951) or in U.S. Pat. No. 1,922,459.

Polyhydric alcohols which may be reacted with the alkylene oxides to prepare the polyalkylene ether polyols employed in the subject invention include ethylene glycol, propylene glycol, the isomeric butylene glycols, 1,5-pentane diol, 1,6-hexanediol, glycerol, trimethylolpropane, 1,2,6-hexanetriol, pentaerythritol, sorbitol, sucrose and alphamethyl glycoside. In addition to polyhydric alcohols, amines having at least two reactive hydrogens, as determined by the Zerewitinoff method, may be employed in the preparation of polyols used in the subject invention. These compounds include amines such as alkylamines, alkanolamines, alkylene polyamines, and aromatic amines such as toluenediamine.

The polyether polyols or polyether polyol blends used have a branching density (designated as B in the following formula) of 400 grams to 700 grams per branching unit. The branching density can be calculated as follows:

$$B = \Sigma(wP_1 + wP_2 + \ldots wP_n) \div$$

$$\Sigma\left(eP_1 \times \frac{f_1 - 2}{f_1} + eP_2 \times \frac{f_2 - 2}{f_2} + \ldots eP_n \times \frac{f_n - 2}{f_n}\right)$$

wherein the subscripts 1, 2, . . . n designate the different polyether polyols (P) used in the blend; wP is the weight of polyether polyol used; eP is the number of equivalents of polyether polyol used; and f is the functionality of the respective polyether polyol. It is apparent from the formula that the polyether polyol blend contain at least one polyether polyol with f>2.0. It is critical that the polyether polyol used have a branching density within the designated range. Polyurethane sealants prepared with polyether polyols below this range are too brittle while those prepared with polyether polyols above this range are too soft.

Inorganic fillers are mixed with the polyether polyols in an amount which is from 0.15 part to 0.7 part by weight per part of polyether polyol. Inorganic mineral fillers which can be used to mix with the polyether polyols are selected from the group consisting of calcium silicate, aluminum silicate, magnesium silicate, and mixtures thereof. One of the functions served by the mineral filler is to reduce shrinkage of the sealant. All of the fillers identified achieve this goal if they are used with polyether polyols of the desired branching density. Generally, if more filler is added, the sealant will be more resistant to shrinkage.

If too much filler is added, however, the viscosity of the polyol-filler mixture will be too high at room temperature. This will make it difficult to mix the polyol-filler component with the isocyanate component. The temperature of the polyol-filler component can be elevated to temperatures of 120° F. to decrease its viscosity and to promote better mixing with the isocyanate component. The viscosity of the polyol-filler component is also dependent upon the filler used. Calcium silicate will provide polyol-filler components with lower viscosities while aluminum silicate and magnesium silicate will provide polyol-filler components with higher viscosities.

The mixture of polyether polyols and inorganic filler is reacted with a polyisocyanate such that the ratio of isocyanate groups of the polyisocyanate to the hydroxyl groups of the polyether polyol is 1.0:1 to 1.2:1. Polyisocyanates which may be used include aromatic, aliphatic, and cycloaliphatic polyisocyanates and combinations thereof. Representative examples are diisocyanates such as m-phenylene diisocyanate, 2,4-toluene diisocyanate, 2,6-toluene diisocyanate, mixtures of 2,4-toluene diisocyanate and 2,6-toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyl-4,4'-diphenylmethane diisocyanate; the triisocyanates such as 4,4',4"-triphenylmethane triisocyanate, polymethylene polyphenylene polyisocyanate and 2,4,6-toluene triisocyanate; and the tetraisocyanates such as 4,4'-dimethyl-2,2',5,5'-diphenylmethane tetraisocyanate. Especially useful due to their availability and properties are toluene diisocyanate, 4,4'-diphenylmethane diisocyanate and polymethylene polyphenylene polyisocyanate. Polymethylene polyphenylene polyisocyanate is a product which results from the phosgenation of an aniline-formaldehyde condensation product; it is sometimes called "crude MDI".

As was previously mentioned, catalysts may be used to increase the reaction rate. If catalysts are used, they are added to the mixture of the polyether polyol blend and inorganic filler before the reaction of the mixture with the polyisocyanate.

Urethane catalysts which may be employed in the present invention are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organonometallic compounds such as are disclosed in U.S. Pat. No. 2,846,408. Tertiary amines such as triethylenediamine, triethylamine, diethylcyclohexylamine, N-ethylmorpholine and diethylethanolamine may also be employed as well as mixtures of any of the above. Generally, the amount of urethane-promoting catalyst employed will be from 0.01 percent to 10 percent by weight based on the weight of the polyether polyol.

Although the polyurethane sealants prepared in accordance with the described process have many uses, they are particularly useful as heat barriers when used in the manufacture of aluminum window and door frames. Other sealants will shrink when they are used for this purpose. Applicants have found that polyurethane sealants made with polyether polyol blends of the desired branching density and inorganic fillers are shrinkage resistant. Calcium silicate is preferably used as the inorganic filler in amounts from 0.2 part to 0.5 part by weight of polyether polyol when the sealant is used for this purpose. It will not only provide a sealant which is shrinkage resistant and has good tensile strength and shore D hardness, but it will also allow easy mixing of the polyol-filler component and isocyanate component.

The properties of the polyurethane sealants in the examples which follow were determined by their respective American Society for Testing Materials test method. The test methods for the various properties are identified in the following table.

TABLE 1

| Sealant Property | Test Method |
| --- | --- |
| Brookfield Viscosity | ASTM D-2196 |
| Tensile Strength | ASTM 638 |
| Elongation | ASTM 638 |
| Shore D Hardness | ASTM D-2240 |
| Heat Distortion | ASTM D-648 |

Shrinkage was measured by filling aluminum channels 12 inches long by ½ inch wide by ½ inch deep with the polyurethane sealant. The sealant was flush with the ends of the channels after curing before cycling. After filling the channels, they were stored in a cooler at −20° F. for 6 hours. They were then removed from the cooler and allowed to reach room temperature. After reaching room temperature, they were stored in an oven at 180° F. for 12 hours. This cycle was repeated 20 times. Then shrinkage measurements were taken at each end of the channel with a caliper. The total shrinkage was computed and this was divided by 12 (the length of the channel) to determine the percent shrinkage.

EXAMPLE 1

In a reaction vessel 180 grams of a polyether polyol (Polyol A) having a hydroxyl number of 490 and functionality of three prepared by oxyethylating monoethanolamine are mixed with 120 grams of a polyether polyol (Polyol B) having a hydroxyl number of 146 and a functionality of two prepared by oxypropylating propylene glycol. Seventy-five grams of calcium silicate and 0.6 gram of 16 percent zinc neodecanoate are added to the reaction vessel. The mixture is reacted with 281 grams of crude MDI having a functionality of 2.7.

The ratio of isocyanate groups of the polyisocyanate to hydroxyl groups of the polyether polyol is 1.1:1.0.

The branching density of the polyol blend is calculated as follows:

$$C = \frac{180 + 120}{\frac{3-2}{3} \times 1.57 + \frac{2-2}{2} \times .312}$$

$$C = \frac{300}{.52} = 619 \text{ g/branching unit}$$

EXAMPLE 2

In a reaction vessel, 90 grams of a polyether polyol (Polyol C) having a hydroxyl number of 393 and functionality of three prepared by oxypropylating trimethylolpropane are mixed with 90 grams of a polyether polyol (Polyol D) having a hydroxyl number of 230 and a functionality of three prepared by oxypropylating trimethylolpropane.

Thirty-two grams of aluminum silicate and 2.25 grams of triethylenediamine are added to the reaction vessel. The mixture is reacted with crude MDI having a functionality of 2.7.

The ratio of isocyanate groups of the polyisocyanate to hydroxyl groups of the polyether polyol is 1.1:1.0. The branching density of the polyol is computed as follows:

$$C = \frac{90 + 90}{\frac{3-2}{3} \times 0.63 + \frac{3-2}{3} \times 0.37}$$

$$C = 180 \times 3$$

$$C = 540 \text{ grams/branching unit}$$

EXAMPLES 3-10

Example 1 was duplicated except the amounts and types of filler were varied. The amount and type of filler used in these examples is listed in Table 2 which follows. The properties of the resulting polyurethane sealants are also listed in this table.

TABLE 2

| Example | Filler Used | Amount of Filler (grams) | Tensile Strength (p.s.i.) | Shore D Hardness | Impact Strength 1200 lbs./in. Notched | Impact Strength 1200 lbs./in. Un-Notched | Heat Distortion in °F. at 66 p.s.i. | Shrinkage % |
|---|---|---|---|---|---|---|---|---|
| 1 | Calcium Silicate | 75 | 7,300 | 71-77 | 1.2 | 3.0 | 126 | 1.30 |
| 3 | Calcium Silicate | 128.6 | 7,310 | 70—70 | 1.1 | 3.4 | 124 | 0.55 |
| 4 | Calcium Silicate | 200 | 7,570 | 77—77 | 1.1 | 3.6 | 125 | 1.10 |
| 5 | Aluminum Silicate | 75 | 7,130 | 79—79 | 1.1 | 4.1 | 125 | 1.50 |
| 6 | Aluminum Silicate | 128.6 | 7,270 | 76—76 | 1:1 | 3.0 | 125 | 1.30 |
| 7 | Aluminum Silicate | 200 | 7,470 | 75—75 | 1.1 | 2.8 | 125 | 1.00 |
| 8 | Magnesium Silicate | 75 | 7,100 | 77—77 | 1.1 | 3.1 | 124 | 0.90 |
| 9 | Magnesium Silicate | 128.6 | 6,170 | 76—76 | 1.1 | 3.6 | 124 | 0.60 |
| 10 | No filler | — | 7,850 | 77—77 | 1.1 | 5.4 | 125 | 2.20 |

The embodiments of the invention in which an exclusive privilege or property is claimed are defined as follows:

1. In the process of manufacturing aluminum window and door frames which involves using a substance which acts as a heat barrier, the improvement comprising using a polyurethane sealant composition prepared by
   (a) mixing a polyether polyol or polyether polyol blend having a branching density of 400 grams to 700 grams per branching unit with an inorganic filler selected from the group consisting of calcium silicate, aluminum silicate, magnesium silicate, and mixtures thereof, said filler being added in an amount which is from 0.15 part to 0.7 part by weight per part by weight of polyether polyol or polyether polyol blend, and
   (b) reacting the mixture made in accordance with paragraph (a) with an organic polyisocyanate such that the ratio of isocyanate groups of the polyisocyanate to the hydroxyl groups of the polyether polyol is 1.0:1 to 1.2:1
as the substance which acts as a heat barrier.

2. The process of claim 1 wherein the polyether polyol is a blend of (a) a polyether polyol having a hydroxyl number of 490 and functionality of three prepared by oxyethylating monoethanolamine and (b) a polyether polyol having a hydroxyl number of 146 and a functionality of two prepared by oxypropylating propylene glycol in a weight ratio of (a) to (b) of 1.5:1.0.

3. The process of claim 2 wherein the polyisocyanate is polymethylene polyphenylene polyisocyanate.

4. The process of claim 3 wherein the inorganic filler is calcium silicate and the weight ratio of the polyether blend to inorganic filler is 1:0.3 to 1:0.5.

* * * * *